United States Patent [19]
Jex

[11] Patent Number: 5,273,819
[45] Date of Patent: Dec. 28, 1993

[54] FIBER REINFORCED RESIN COMPOSITES, METHOD OF MANUFACTURE AND IMPROVED COMPOSITE PRODUCTS

[76] Inventor: Edward R. Jex, 475 Hickory Lane, Berwyn, Pa. 19312

[21] Appl. No.: 476,119

[22] Filed: Feb. 1, 1990

Related U.S. Application Data

[63] Continuation of Ser. No. 919,327, Oct. 15, 1986, abandoned.

[51] Int. Cl.$^5$ ............................. B32B 5/06; B32B 5/32
[52] U.S. Cl. .................................... 428/297; 428/298; 428/323; 428/332; 428/408; 264/172; 264/174; 264/177.2; 264/209.8
[58] Field of Search ...................... 264/172, 174, 177.2, 264/209.8, DIG.; 428/303, 408, 283, 284, 323, 297, 298, 332

[56] References Cited

U.S. PATENT DOCUMENTS

| | | | |
|---|---|---|---|
| 3,669,920 | 6/1972 | Haggis et al. | 523/222 |
| 4,056,591 | 11/1977 | Goettler et al. | 428/36 |
| 4,057,610 | 11/1977 | Goettler et al. | 264/209.8 |
| 4,111,891 | 9/1978 | Reynolds, Jr. | 523/159 |
| 4,141,678 | 2/1979 | Jex | 264/40.7 |
| 4,175,070 | 11/1979 | Klein et al. | 523/153 |
| 4,240,997 | 12/1980 | Jex | 264/40.7 |
| 4,339,490 | 7/1987 | Yoshioka et al. | 428/213 |

Primary Examiner—Patrick J. Ryan
Assistant Examiner—Richard C. Weisberger
Attorney, Agent, or Firm—Weiser & Associates

[57] ABSTRACT

Improved ram extruded composite products, methods of manufacture. The composite is a thermoset resin which is tailor-made for specific industrial applications. A typical composite is constituted of a phenolic resin which contains carbon fibers of various lengths where each length of fibers are oriented in a pre-selected, predetermined orientation. The products are preferably made by ram-extrusion. A large variety of different types of fibers and resins are useful.

29 Claims, 10 Drawing Sheets

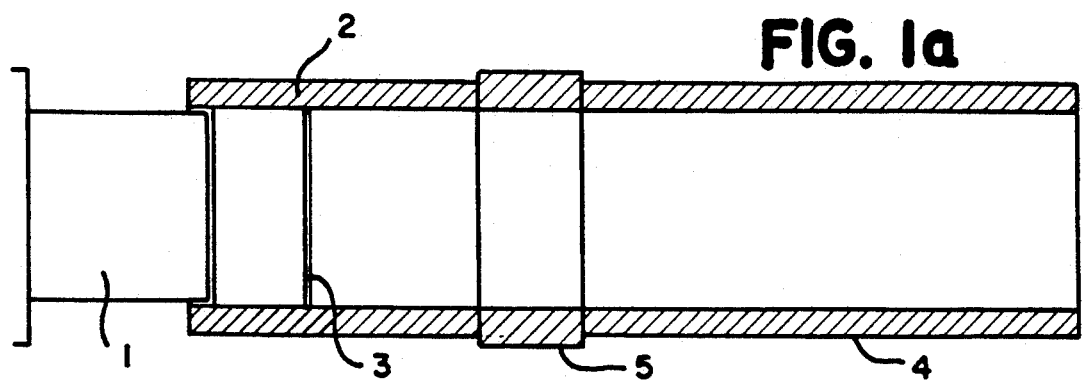
FIG. 1a
FIG. 1b
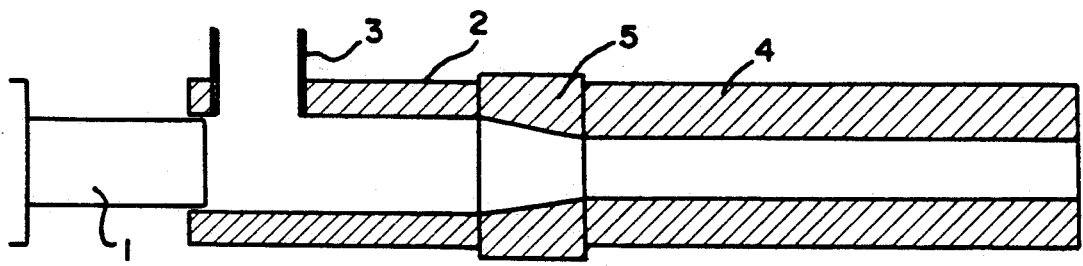
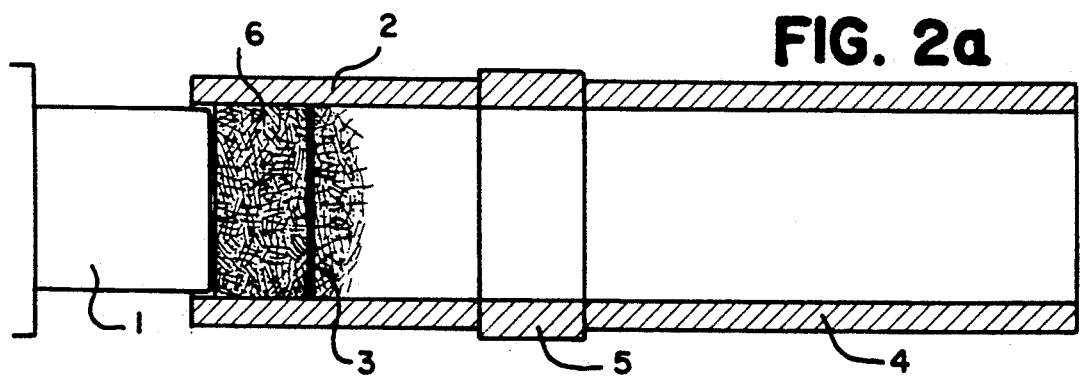
FIG. 2a
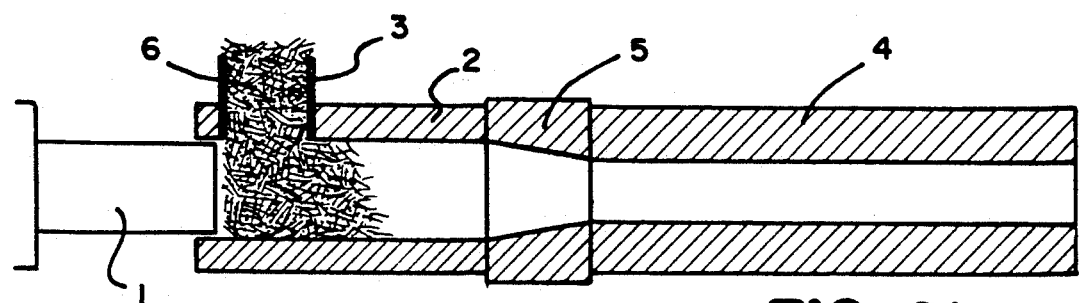
FIG. 2b

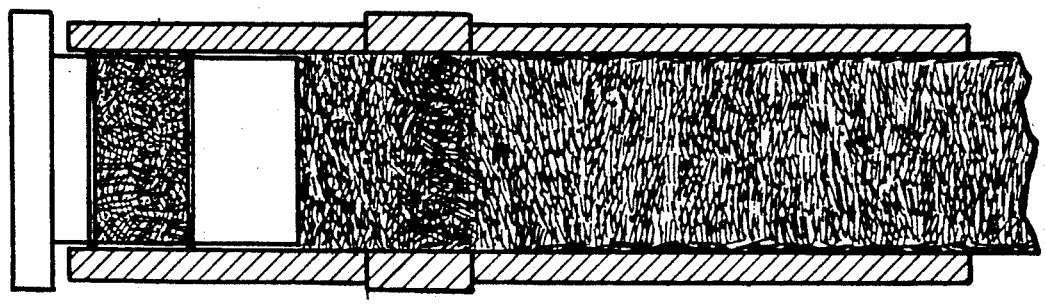
FIG. 3a
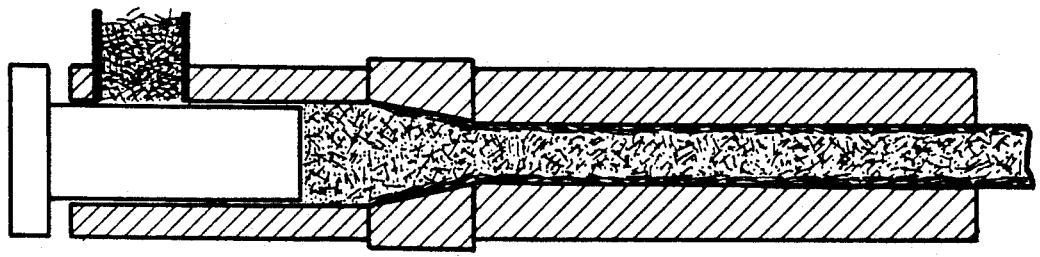
FIG. 3b
FIG. 5a
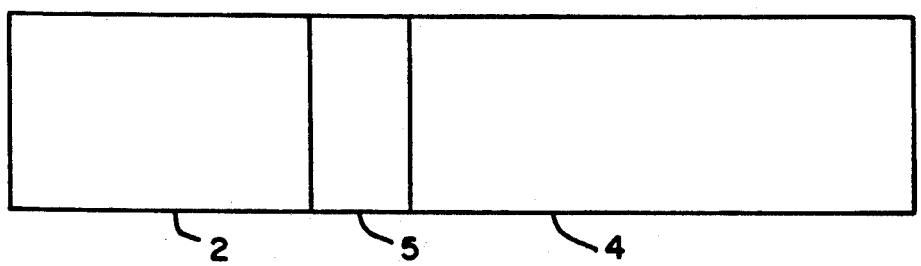
FIG. 5b

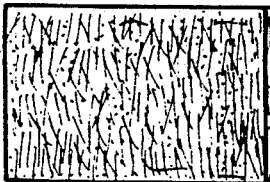 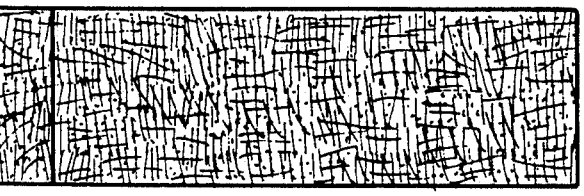 
FIG. 9a　　　　　　　　　　FIG. 9c
FIG. 9b
  
FIG. 10a　　　　　　　　　FIG. 10c
 
FIG. 10b
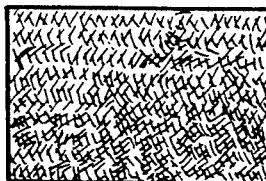  
FIG. 11a　　　　　　　　　FIG. 11c
 
FIG. 11b

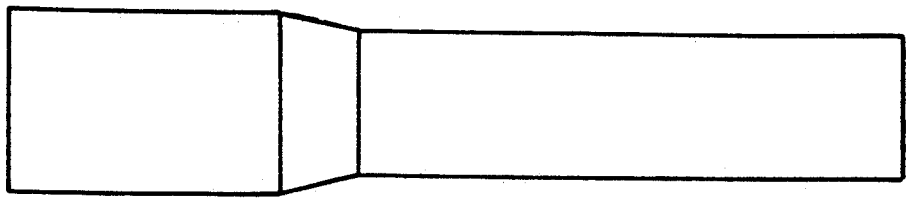
FIG. 12a
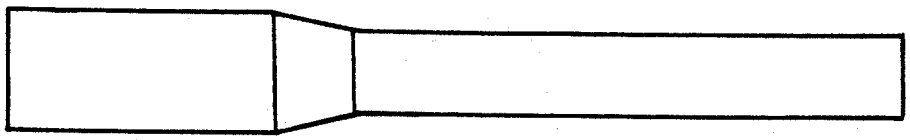
FIG. 12b
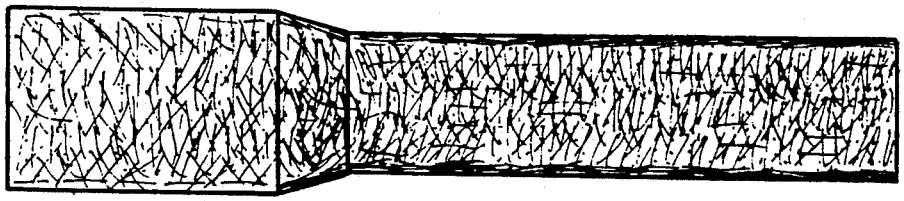 
FIG. 13a       FIG. 13c
FIG. 13b
 
FIG. 14a       FIG. 14c
FIG. 14b

FIBER REINFORCED RESIN COMPOSITES, METHOD OF MANUFACTURE AND IMPROVED COMPOSITE PRODUCTS

This application is a continuation of application Ser. No. 06/919,327, filed Oct. 15, 1986, now abandoned.

The present invention relates to fiber-reinforced ram extruded synthetic resin composites and to a method for their production. More particularly, the present invention relates to fiber reinforced ram extruded thermosetting resin composites wherein the fibers are oriented in a predetermined manner during extrusion.

It is well known to form structures comprising various resins and/or compounds together with carbon fibers, metallic fibers, fiber glass or plastic filaments so as to form structures which are light weight and have good mechanical properties. Generally, short fiber reinforced resins have inferior mechanical properties to conventional continuous fiber systems but can be extruded or molded into very complex shapes at high production rates. Thermosetting resins are most preferably because of their lock of creed or cold flow high heat resistance, chemical resistance, dimensional and thermal stability, relative low cost and easy moldability.

U.S. Pat. No. 4,111,891, to Reynolds discloses a moldable composition of phenolic resin binder, carbonaceous component, asbestos fiber and silicon carbide which is suitable as a brake shoe composition for railroad cars. U.S. Pat. Nos. 4,141,678 and 4,240,997, which are herewith incorporated by reference, disclose a machine and process for making extrusions of thermosetting materials by means of a ram and die arrangement.

U.S. Pat. No. 4,175,070 to Klein et al. discloses a high carbon friction lining consisting of a reinforced fiber selected from a combination of asbestos, glass and mineral fibers, metal powders, organic and inorganic friction modifiers, and carbon or graphite particles retained after compression in a matrix created by a thermosetting phenolic resin.

U.S. Pat. No. 3,669,920 to Haggis et al. discloses carbon fiber reinforced resin composites wherein the resin is the product of a polyisocyanate-terminated prepolymer obtained by reacting a polyisocyanate and a polyol. The fibers are used in the form of bundles, hanks, rovings, etc. which may be laid individually in a mold and then impregnated with the resin. Alternatively the fibers may be chopped and added to a curable mixture of resin material and then molded and cured.

Properties of the fiber are directional. Thus, a wide range of properties is possible depending upon fiber orientation developed during molding. The most efficient use of the fiber fillers from a structural standpoint is when the fibers or filaments are parallel to each other. This is particularly the case where the stress direction is parallel to or perpendicular to the fiber direction. In addition to strength and modulus, fiber orientation can strongly influence molding shrinkage. Moreover, the properties of a finished product can be more readily predicted with regard to reinforced resins having parallel or unidirectional fibers than with randomly placed fibers.

One of the drawbacks in utilizing short fibers prior to the present invention has been the inability to control the direction of the fibers together with their distribution. The article of Bruce B. Fitts entitled, "Fiber orientation of glass fiber-reinforced phenolics", ME Nov. 1984, pp. 18-22, discloses that the variables that influence fiber orientation include mold and gate design, method of molding, processing conditions and material flow characteristics. In compression molding, where a charge closely matches the size of the mold, the fibers orient randomly in a plane perpendicular to the mold force. In flow molding, the orientation distribution becomes more complex. Depending on section thickness, fibers in the inner core regions generally orient approximately transverse to the flow direction while near mold surface shear stresses tend to align the fibers with the flow and thus produce a layered structure. However, the fiber distribution in ram extrusion is not influenced by flow dynamics.

Accordingly, it is an object of the present invention to provide for a fiber reinforced extruded product having improved and predictable mechanical properties.

It is a further object of the invention to provide for a continuous extrudate of undetermined length having predictable and equivalent properties throughout the length of the extrudate.

Another object of the invention is to provide products which have improved tensile strength, flexural strength, flexural modulus, compressive strength and impact strength compared to the molded product.

A further object of the invention is to provide composite products which have predictable flexural strength and limited heat expansion cross axis to the length of the extrudate.

Another object of the invention is to provide for a composite product which has uniform properties throughout the composite in all directions.

A further object of the invention is to provide for a method for continuously producing fiber reinforced ram extruded composites which have predetermined, predictable and equivalent properties throughout the extrudate.

Another object of the invention is to provide for a method to change the properties of the extrudate in a predetermined, predictable manner.

For further details, reference is made to the detailed description which follows, in light of the accompanying drawings wherein FIGS. 1a and 1b show the top and side views respectively of a schematic diagram of a ram extrusion apparatus.

FIGS. 2a and 2b show the apparatus of FIG. 1 wherein the fiber filled compound is feeding from the hopper tube into the fill tube section portion of the tool.

FIGS. 3a and 3b show the final stage when the fiber reinforced composite is rammed into the die.

FIGS. 5a and 5b show the apparatus of FIG. 1 wherein there is no reduction in throat size.

FIGS. 9a, 9b and 9c show the orientation of fibers in the apparatus of FIG. 8 wherein all the fibers are the same length (medium or long).

FIGS. 10a, 10b and 10c show the orientation of fibers in the apparatus of FIG. 8 wherein the fibers all have different lengths, short, medium and long.

FIGS. 11a, 11b and 11c show the orientation of fibers in the apparatus of FIG. 8 wherein the fibers are a mixture of short lengths, i.e. not greater than ⅛" and under.

FIGS. 12a and 12b show the apparatus of FIG. 1 wherein the throat surfaces are angled inwardly in both width and thickness planes.

FIGS. 13a, 13b and 13c show the orientation of fibers in the apparatus of FIG. 12 wherein the fibers are all the same length, medium or long.

FIGS. 14a, 14b and 14c show the orientation of fibers in the apparatus of FIG. 12 wherein the fibers all have different lengths, short, medium and long.

Figure 16A:
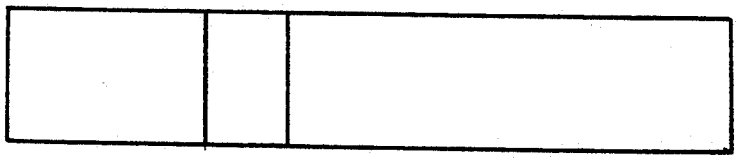
Figure 16C:
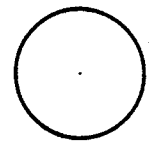
Figure 16B:
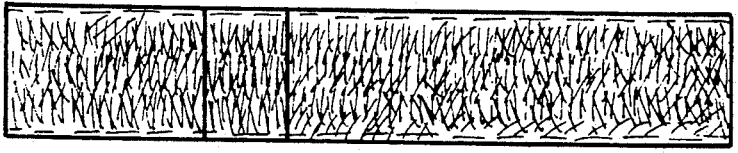
Figure 16D:

FIGS. 16a and 16b show another embodiment of the invention where the ram, filler section and die are round, the fill tube, throat and die all have the same cross-section (no angles in tooling) and wherein all fibers are of the same length; medium or long. FIG. 16c is an end view of a rod produced by the tooling of FIG. 16a. FIG. 16d is an end view of a rod produced by the tooling of FIG. 16b.

Figure 17A:
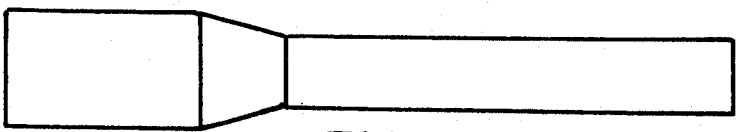
Figure 17C:
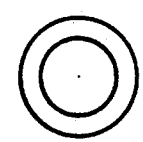
Figure 17B:
Figure 17D:

FIGS. 17a and 17b show another embodiment of the invention wherein the ram, filler section and die are round, the throat is angled inwardly at X degree and wherein the fibers are the same length; medium or long. FIG. 17c is an end view of a rod produced by the tooling of FIG. 17a. FIG. 17d is an end view of a rod produced by the tooling of FIG. 17b.

Figure 18A:
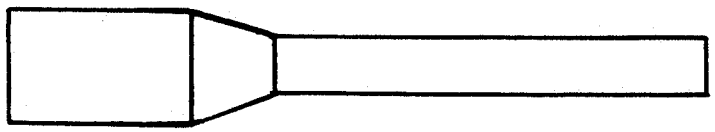
Figure 18C:
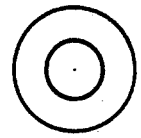
Figure 18B:
Figure 18D:
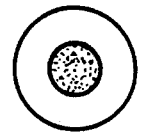

FIGS. 18a and 18b shows another embodiment of the invention wherein the rod has a sharper throat angle than shown in FIG. 17, and wherein the fibers are of the same length, medium or long. FIG. 18c is an end view of a rod produced by the tooling of FIG. 18a. FIG. 18d is an end of a rod produced by the tooling of FIG. 18b.

Figure 19A:
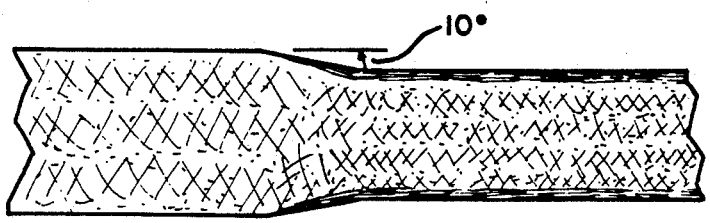
Figure 19B:
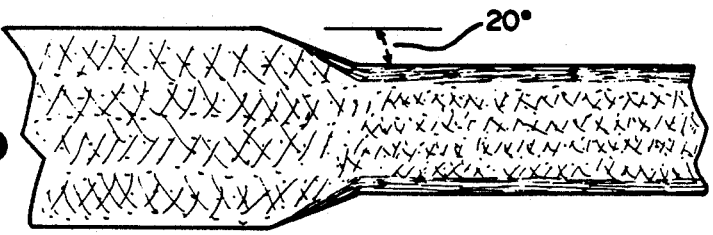
Figure 19C:
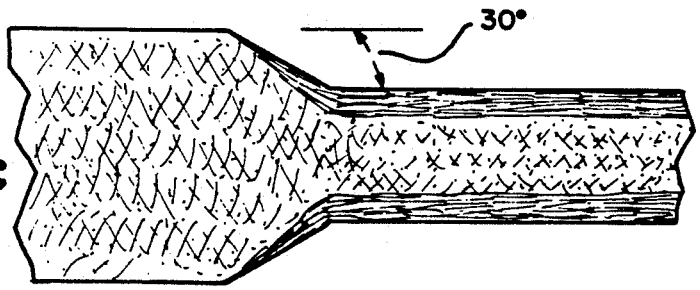

FIGS. 19a, 19b and 19c show the effect of different throat angles and ratio of fill tube area to the die area on the orientation of fibers.

Figure 20:
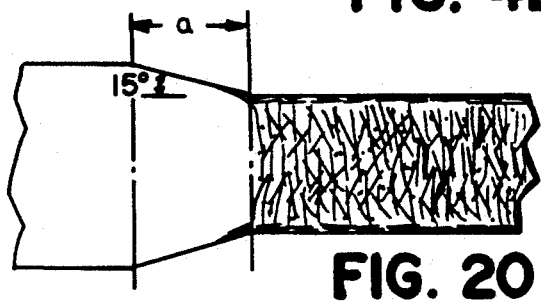

FIG. 20 is an illustration of the angle or slope of the throat where (a) represents the length of the throat and the angle of the throat is 15 degrees.

Figure 21:
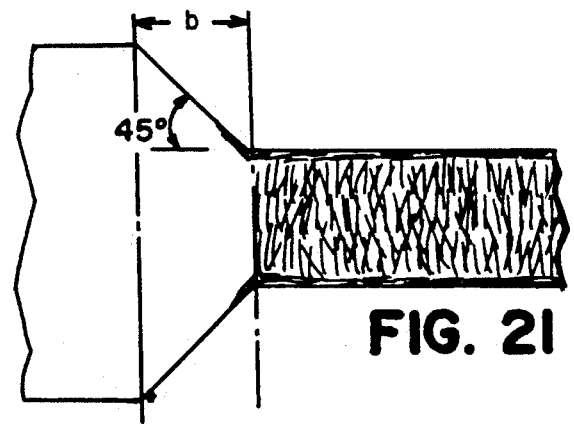

FIG. 21 shows the throat at a 45° angle where (b) represents the length of the throat which is shorter than (a).

Figure 22:
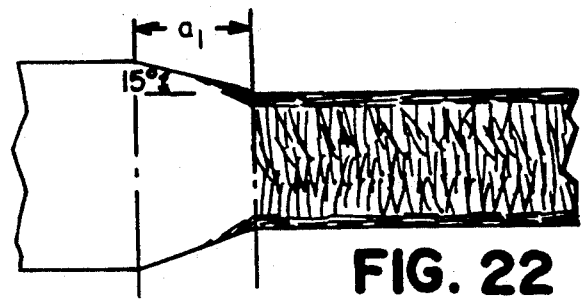

FIG. 22 shows another illustration of a slope of a throat which here is 15 degrees, and the length of the throat is (a₁) where (a₁) is shorter than (a) or (b).

Figure 23:
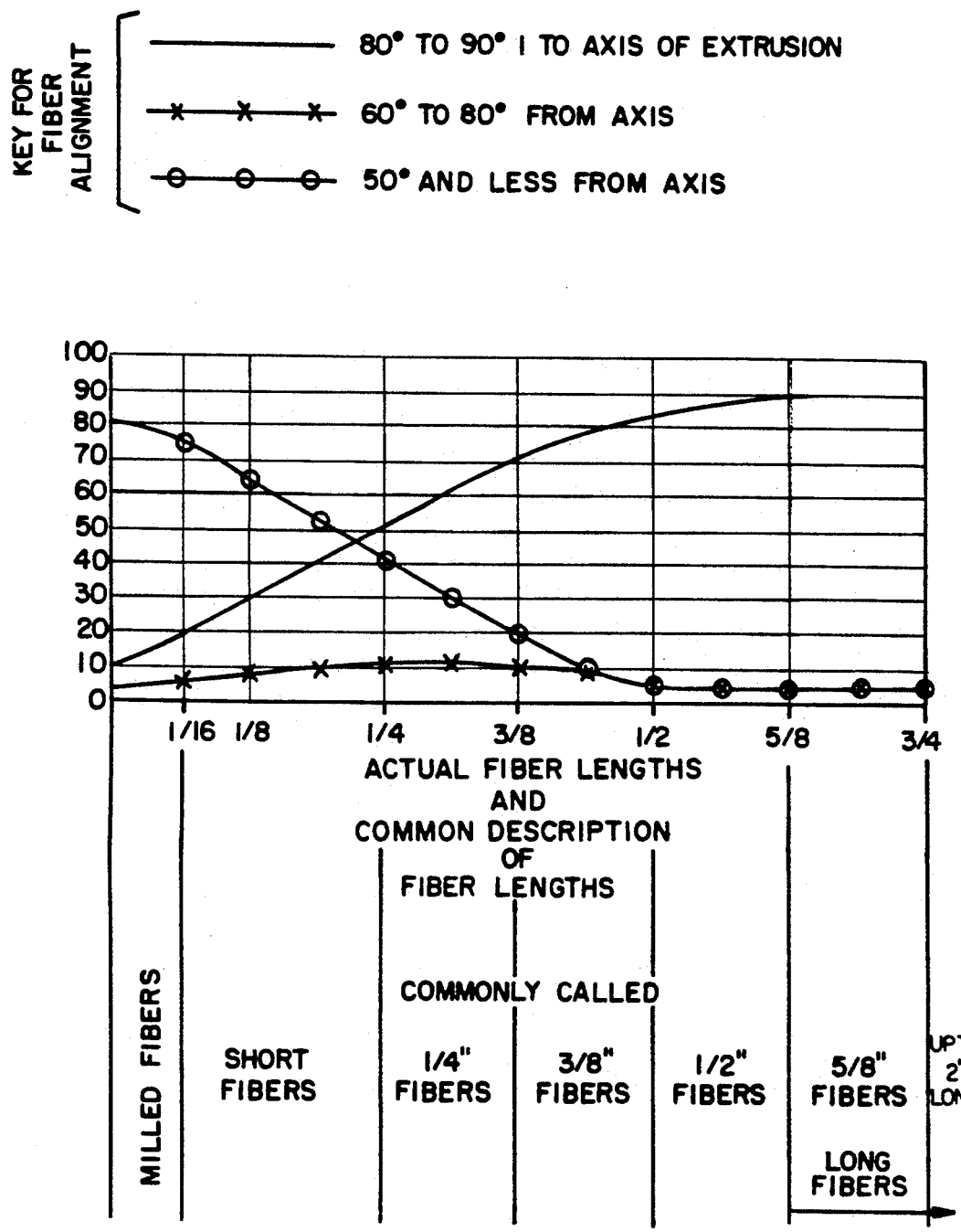

FIG. 23 is a graph showing percent of fiber oriented (at angles shown) vs. length of fiber, assuming all fibers in mix are same.

Figure 24:
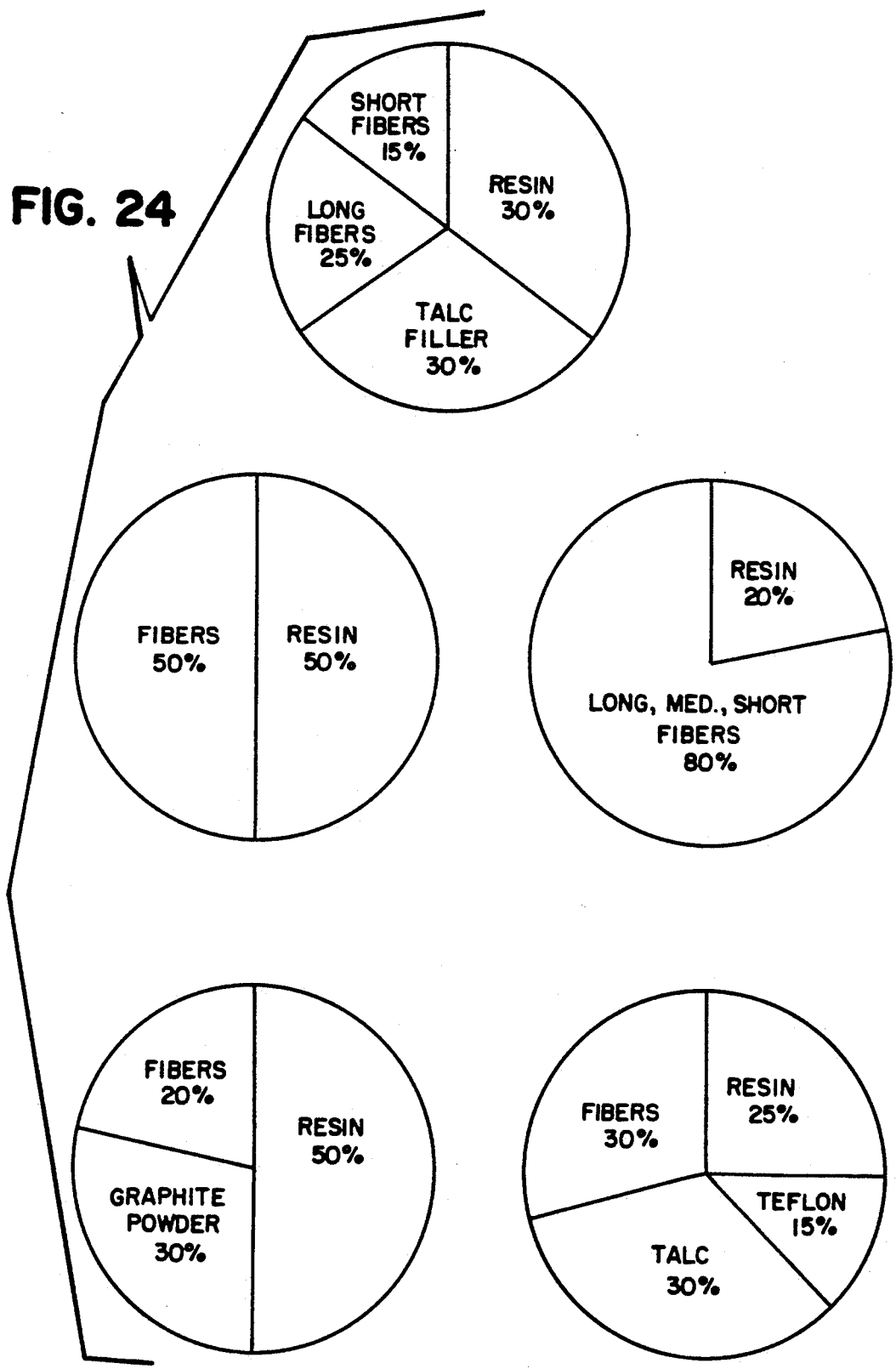

FIG. 24 shows a pie graph of the composition of compounds of embodiments of the invention on ratios of fibers with and without additional filler (i.e. graphite powder or talc).

The same reference numerals are used in the different Figures to designate similar elements.

According to the present invention there is provided a ram extruded composite product having improved mechanical properties. More particularly, the present invention provides a fiber-reinforced shaped ram extruded synthetic resin composite having a predictable amount of unidirectional fibers.

In accordance with one embodiment of the invention there is provided a method of producing extrusions of fiber reinforced thermosetting resin composites wherein the orientation of the fibers is controlled so as to be aligned in the extrudate in one or more predetermined directions.

It is an important and unexpected aspect of the invention that no other product as far as is known provides such a composite with the pre-selected fiber alignment throughout the entire length of the product. Thus, in accordance with the invention a product is manufactured of any length on a continuous basis and which have uniformly throughout the entire length the pre-selected fiber alignment. This observation applies to all of the composite products in accordance with the invention.

In accordance with one embodiment of the invention there is provided a fiber reinforced ram extruded shaped thermosetting resin composite having from about 20 to about 80% by volume of reinforcing fibers wherein the fibers are aligned so that at least 80% are aligned in a predetermined direction.

In a preferred embodiment, at least 50% of the fibers present are from about ¼ to about 2 inches in length and at least 80% of these fibers are predeterminedly oriented perpendicularly to the longitudinal axis of the shaped resin.

In accordance to another preferred embodiment of the invention, there is provided a fiber-reinforced, ram extruded phenolic resin shaped composite having improved flexural strength, which composite has a longitudinal axis and comprises a phenolic thermoset resin and a maximum of about 60% by volume of fibers distributed thoughout the composition. In the composite from about 0 to about 60% of the fibers have a fiber length of less than about ¼ inch and from about 40 to 100% of the fibers have a fiber length of about ¼ to about 2 inches. At least 20% of the fibers having a length of about ¼ to about 2 inches are predeterminedly oriented perpendicularly to the longitudinal axis. The remainder of the fibers are predeterminedly oriented or are oriented in a random direction.

Preferably, at least about 50% of the fibers of ¼ to 2 inches length are oriented perpendicularly to the longitudinal axis. More preferably, at least about 90% of said fibers are oriented perpendicularly to the longitudinal axis. Generally, the fibers are oriented between about 80 to about 90 degrees to said longitudinal axis.

It has been found that a desirable strength for aerospace parts are obtained from shaped compositions having the fibers oriented between about 80 to about 90 degrees to the longitudinal axis. Advantageously the fibers are between ¼ and 2 inches and, if desired, the compositions include filler materials in an amount of 0 to about 30% by volume of composition. Preferably, at least one non-fibrous filler material is included in the composite.

In accordance with a preferred embodiment of the invention there is provided a carbon fiber-reinforced ram extruded phenolic resin composite comprising a phenolic thermoset resin, and carbon fibers having a fiber length of about ¼ to about 1 inch embedded throughout the resin. At least 90% of said fibers are predeterminedly aligned during extrusion perpendicularly to the axis of extrusion and the remainder of the fibers are not predeterminedly oriented and are in a random direction.

In the resin composition, preferably about 50% of the carbon fibers are of substantially equal length and are substantially aligned in two predetermined directions. One portion of the fibers being aligned perpendicularly to the axis of extrusion and the remaining portion being substantially non-perpendicularly aligned.

More particularly, a carbon fiber-reinforced ram extruded phenolic resin shaped composite that has improved flexural strength, has a longitudinal axis and, consists of a phenolic thermoset resin, and a maximum of about 60% by volume of carbon fibers distributed throughout the composite. In the composite the carbon fibers are by percentage of total fibers in the composite from 0 to about 60% fibers having a fiber length of less than about ¼ inch, from about 40 to about 100% fibers having a fiber length of about ¼ to about 2 inches; at least about 20% of the fibers having length from about ¼ inch to 2 inches are being predeterminedly oriented perpendicularly to the longitudinal axis and the remainder of the fibers are not predeterminedly oriented or are in a random direction in said composite. The composite also contains from 0 to about 30% by volume of filler material, the filler material and the carbon fibers comprising together not more than about 80% by volume of the composite.

In accordance with a further embodiment of the invention there is provided a method of producing a very short fiber-reinforced phenolic resin composite wherein only 20% of the total percentage of fibers which are embedded throughout the resin are selectively oriented perpendicularly to the axis of extrusion.

The method as discussed below comprises the steps of ram extruding through a die of a ram extrusion apparatus a composition comprising a phenolic thermosetting resin and reinforcing fibers. The fibers may comprise a maximum of 80% by volume of the composition. The fibers by percentage of total fibers in the composite being a) from 0 to 60% fibers having a fiber length of less than ¼ inch, and b) from 40 to 100% fibers having a fiber length of ¼ to about 2 inches.

The method further includes controlling the alignment of the reinforcing fibers by varying the length of the fibers and the angle of the throat between the filler section and the die of the apparatus.

The method further includes controlling variations in back pressure from the composition variations in back pressure from the composition during extrusion through the die whereby at least 20% of said fibers are oriented perpendicularly to the axis of extrusion and all of the remaining fibers are not predeterminedly oriented or in a random direction.

Referring to the above Figures, a detailed description follows.

In the detailed description of the various embodiments of the invention as illustratively shown in the Figures listed above, the Figures show only the cross-section of the tooling and how the fibers are positioned into the pre-selected positions in accordance with the invention. In the Figures a) shows the top view, b) shows the side view and c), where applicable, shows an end cross-section of the apparatus and/or composite material which is extruded from the apparatus.

In the illustrations the following key to the arrangement of the fibers and their length applies.

The angles at which the fibers are shown to be positioned is illustrative of the invention showing the effect of the pre-selected tooling angles upon the fiber angles and positions.

In the Figures and in the description of the invention the following definitional aspects apply.

Key of Fiber Length and Orientation

_____ = Long Length Fibers: about ⅛" to about 1".
___ = Medium Length Fibers: about ⅛" to about 178 ".
__ = Short Length Fibers: all less than about ⅛".
· = End View of Fibers.
 = All white area is base resin and now fiber fillers (when needed) in the form of powders or flakes.

In referring the FIG. 1a and 1b, these show in top and side view respectively, a schematic representation of a ram extrusion apparatus which can be used in the preparation of the composites of the invention.

The apparatus includes a ram 1 which moves back and forth in the fill tube section 2. Fill tube section 2 is equipped with a hopper tube section. Die 4 is attached to the fill tube by means of a throat section 5.

In FIG. 1, the ram 1 is shown partly engaged in fill tube section 2. Hooper tube 3 is kept filled with material to be extruded. When ram 1 moves away from die 4 to the point where it exposes the connection between the hopper tube 3 and the fill tube section 2, material to be extruded descends or is forced into the interior of section 2. When the ram again moves toward the die, this material is compressed by the ram and introduced under controllable pressure into the die 4 through its throat section 5.

FIG. 2 shows the beginning stage where the fiber reinforced composite 6 is fed into the fill tube section 2 through the hopper tube 3 so that it can be rammed into die 4 by repeated strokes of ram 1.

FIG. 3 shows the ram apparatus filled with composite after extrusion has taken place. The fibers in the throat and die sections of the apparatus show an alignment and orientation different than the random orientation shown in the composite in the fill tube.

Figure 4A:
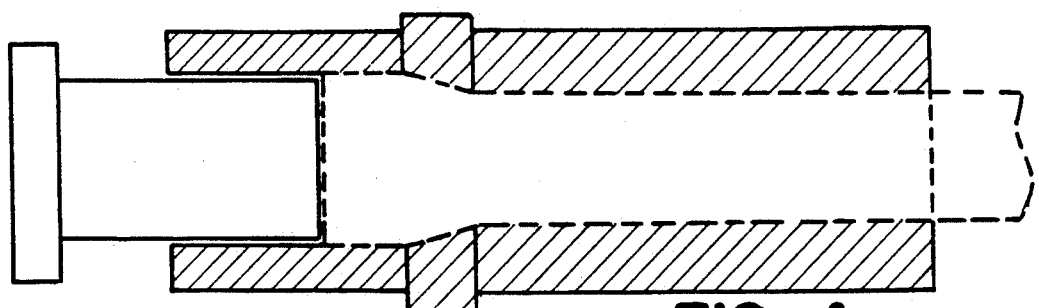
FIGS. 4a and 4b show the relationship of the apparatus of FIG. 1 to the representation of the extrudate which is shown in the following Figures.
Figure 4B:
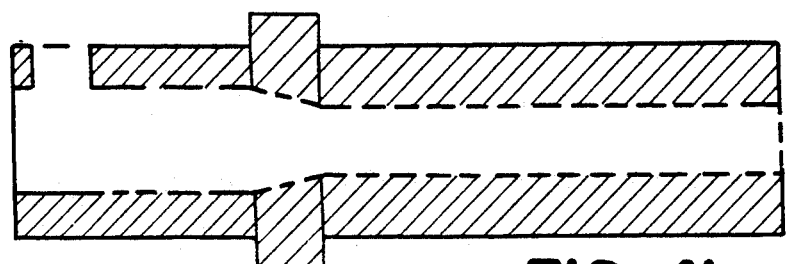

FIG. 4 shows the relationship between the apparatus shown in FIGS. 1 to 3 and the form of the composite. Only that area which is outlined by the dashed lines will be shown in the subsequent Figures.

In FIG. 5 there is shown a schematic representation of the apparatus described in FIG. 1 wherein the fill tube 2, die 4 and throat 5 all have the same cross-section. There is no angle in tooling.

Figure 6A:
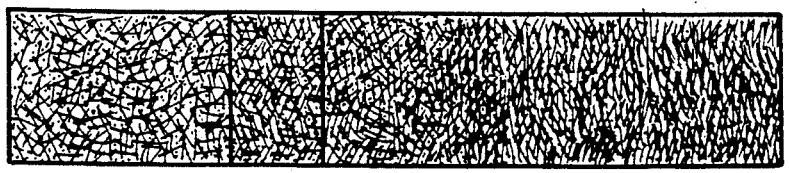
FIGS. 6a, 6b and 6c show the orientation of short or medium fiber lengths in the apparatus of FIG. 5 when all the fibers are the same length.
Figure 6C:
Figure 6B:
Figure 7A:
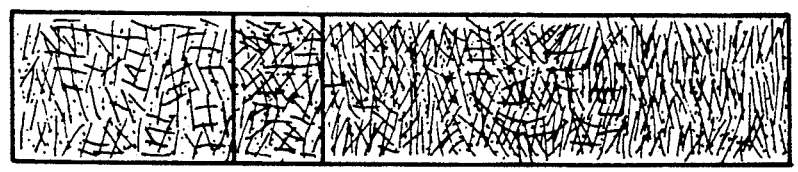
FIGS. 7a, 7b and 7c show the orientation of fibers wherein there are fibers of different length (short, medium, long) in the apparatus of FIG. 5.
Figure 7C:
Figure 7B:

FIGS. 6 and 7 show the orientation of fibers in the composite formed in a ram extrusion apparatus as shown in FIG. 1 having the conformation shown in FIG. 5.

In FIG. 6, it will be noted that where the fibers are all of the same length and are either medium or long fibers (no short fibers) there occurs in accordance with this embodiment of the invention a predominant alignment of the fibers in the cross-axis (90°) direction (or perpendicular to the axis of extrusion) and a very limited alignment percentage of the fibers in the direction of extrusion (or in the axis of extrusion).

Where all the fibers are as an average long fibers that is from about ½ through about 1" in length, at least about 75 and preferably from 80% to at least 90% of all the fibers will be aligned at an angle of about 80° to 90° perpendicular to the axis of extrusion.

As illustrated in FIG. 7 where the fibers are of different length in the same mix, that is short, medium and long fibers, there is a strong dominance of the longer and medium fibers to be oriented in the plane at 90° to the axis of extrusion. The long and medium length fibers are oriented in the same percentage ranges as discussed above.

The shorter fibers (that is those that are less than about ⅛" in length) are from about 10% to 50% randomly oriented.

Figure 8A:
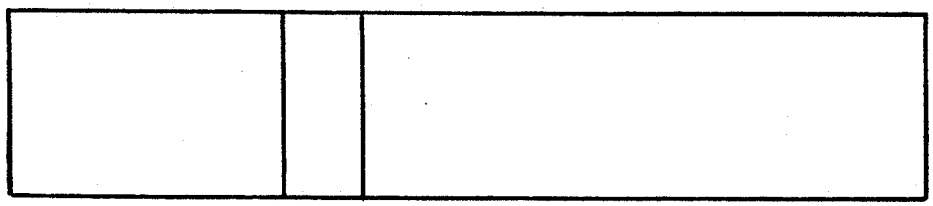
FIGS. 8a and 8b show the apparatus of FIG. 1 wherein there is a single reduction in throat size.
Figure 8B:
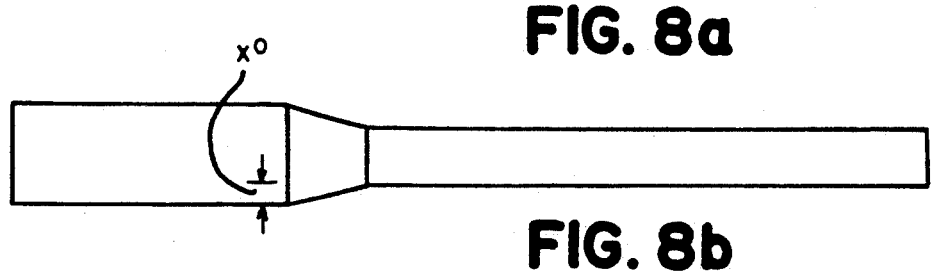

With respect to FIG. 8 the embodiment of the invention is shown wherein the throat of the die is angled inwardly at X° in the top and bottom of the thickness plane. The width of the filler section, throat and die are all the same.

In FIG. 9 it will be noted that where all the fibers are of the same length, medium or long, the following observations are made.

The greatest percentage of the fibers are aligned in the cross-axis plane of the axis of the plane of extrusion, as was explained above. It is noteworthy however that the fibers on the surface of both the bottom and the top of the thickness plane are aligned in the direction of the extrusion axis.

It is noteworthy that the product obtained in accordance with the invention as a result of and from this thermoset composite is ideally suited for vanes in sliding vane air compressors and vacuum pumps and vanes for air hoists. The high flexural strength required across the vane is achieved by the cross-axis alignment of the majority of fibers (of the medium or long fibers as explained above) which are complimented by axis fiber alignment at the surface of the vane. The fibers in axis alignment serve to control and limit the heat expansion along the length of the vane. Thus, this composite product in accordance with the invention has excellent flexural strength combined with excellent and limited heat expansion along the length of the vane. This is a combination of properties which is highly desirable for this and similar application where the product is exposed to heat variations and yet need high cross axis flexural strength.

With respect to FIG. 10 where all fibers have different lengths, long, medium and short, all remarks made with respect to FIG. 9 apply. Due to the presence of the short fibers in the matrix, particularly the shortest fibers (such as about ⅛" to about 1/32" in length), composites of very high strength are obtained. The short fibers tend to align or be organized in a random fashion intertwining at various angles with the longer fibers. This perscribed interwining and interlocking of the shorter fibers with the longer fibers imparts remarkable and powerful dimensional stability and strength to the entire extrudate. The product may be described by analogy to have numerous ladders where the longer fibers act like sides of a ladder and the shorter fibers act like the rungs of the ladder except that in addition the ladders are three dimensional and themselves interlocking and criss-crossing throughout the entire length of the extrudate product.

FIG. 11 illustrates a fiber mix where all the fibers are of the same short to very short length, as an average not longer than ⅛" and more commonly in the range of 1/32 to 1/16 of an inch in length, and no other fiber lengths are included. It will be noted that there is no dominant alignment of the fibers; that is the fibers are randomly arranged. In situations where a non-directional homogenous product is desired, this type of fiber length is preferred. The products produced in accordance with this invention where the fibers are selectively non-aligned or randomly arranged have uniform properties throughout the composite in all directions. In other words no one single property will be remarkably favored over the others but all properties are uniformly good to highly satisfactory.

FIG. 12 illustrates an embodiment of the invention where the throat surfaces are angled inwardly both in width and thickness planes.

The orientation of fibers from the apparatus of FIG. 12 where the fibers are all of the same length, medium or long, is illustrated in FIG. 13. The following will be noted. An increase in the axially oriented fibers along the four surfaces is produced when both sets of angles in the throat are angled inwardly. Towards the center of the extrudate the fibers are positioned horizontally and vertically. Approximately 80% of the fibers are at about 80% to 90% perpendicular to the axis of extrusion. There remains about 10% of the fibers which are virtually parallel to the axis of extrusion. By changing the throat angles and ratio of fill tube area to die area as described, the percentage of fibers organized parallel to the surface of the extrudate is increased. The effect of this increase of percentage of fibers organized parallel to the sides of the die has been discussed above. It particularly increases the temperature and dimensional stability.

In FIG. 14 in the situation where the fibers have different lengths, that is, long, medium and short, the following will be noted. In this embodiment the shorter fibers fill in the spaces between the medium and longed fibers (this also applies in all the illustration discussed with respect to mixes where there are different lengths of fibers including short fibers). The composite product produced in accordance with the invention is remarkably strong in all planes. These products produced in accordance with this aspect of the invention are particularly well suited as bearings. The product, for instance bearings, are remarkably stronger in the compression test in the axial direction. This is in contrast to products produced by pultrusions which, although they may be stronger in tension in the axial direction, it is to the sacrifice of compression in that same direction. Fibers alligned in the hoop plane 90° to the axis of the bearing greatly prolong the wear life of the bearing.

Figure 15A:
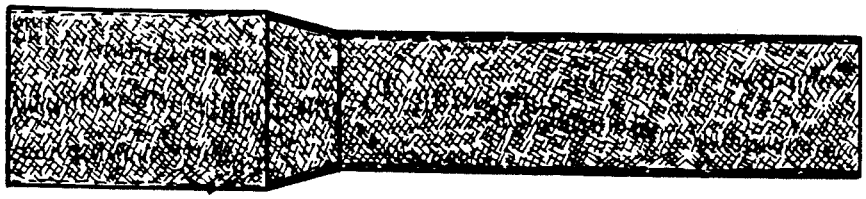
FIGS. 15a, 15b and 15c show the orientation of fibers in the apparatus of FIG. 12 wherein the fibers are a mixture of short lengths, i.e. not greater than ⅛" and under.
Figure 15C:
Figure 15B:
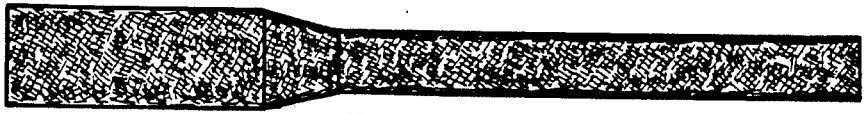

As illustrated in FIG. 15 where all the fibers in the mix are very short, the following will be noted. There is no dominant orientation or arrangement of the fibers other than a small percentage of the fibers aligning in the direction of the axis of extrusion (from about 1 to about 10%) along the outer skin of the extrudate.

The material properties of the composite extrudates which are produced in accordance with the invention are very uniform and so are the physical and electrical tests performed. Where conductive graphite fibers are used in electrical tests, the results are linear.

In reference to FIGS. 16, 17 and 18 which illustrate round rods in three different configurations the following will be noted.

With respect to FIG. 16 it will be noted that the tooling is straight through. That is, there is no throat angle. Where all the fibers are the same length, medium or long, the fibers are predominantly aligned in the cross-axis direction with a limited percent aligned along the axis on the outer surface of the rod.

With respect to FIG. 17 it will be noted that due to the mild or limited throat angle, the fibers at the circumference of the rod from a circumferential layer around the core of the rod. The throat angle tends to cause the fibers to turn and align themselves with the axis of extrusion. The fibers which are within the core or within the inner perimeter of the layer above discussed, are aligned cross-axis to the axis of extrusion.

With respect to FIG. 18 it will be noted that with a sharper throat angle and a higher fill tube area to die area ratio the greatest majority of the fibers are aligned in the axial direction or within 20° of the longitudinal axis of extrusion.

With respect to FIG. 19 it will be noted that various throat angles are illustrated varying for illustrative purposes from 10° to 30° of angle to the axis of direction to the extrudate. It will be noted that with the smaller throat angle the layer at the periphery along the wall of the die oriented in the longitudinal axis of extrusion will be thin. The thickness of the layer at the periphery will increase with the angle of the throat. Thus, where it is desired to have particular properties such as insulation or thermal stability one skilled in the art would want to prefer the products which have a higher proportion of fibers aligned parallel to the axis of the die.

Describing in greater details FIGS. 20, 21 and 22 the following will be noted.

The longer the throat, the greater the density of long fibers which are aligned on the side on the inner surface of the die. Conversely, the shorter the length of the throat, the lesser proportion of long fibers aligned along the inner walls of the die. These situations assume a slope or angle of throat being held constant.

With respect to the slope of the throat, the greater the angle of the slope of the throat, the greater the percentage of long fibers which will not follow the general rule or align themselves perpendicular to the axis of extrusion. Conversely, the smaller the angle of the slope, the greater the percentage of the long fibers which will follow the general rule of aligning themselves perpendicularly to the axis of extrusion. 34

The greater the inward angle (X degree) of the throat the greater is the alignment of the medium or short length fibers in the perpendicular axis to the extrusion.

If it is desired to have an extrudate product which is not straight after exiting from the die that is a curved product, the die will be angled at two different angles with one angle extended deeper on one side that the other.

In this manner, one of average skill in the art can determine the degree of curvature of the extrudate thermoset composite product.

It will be noted that in accordance with the invention it has been noted that medium fibers tend to align themselves as described above and are relatively quicker than long fibers, that is it takes the longer fibers more time to be aligned in that desired alignment. Therefore if one is to operate with long fibers it is desired to have appropriate long throat length or melt viscosity. Other variants including percent of fibers in the plastic compound can be adjusted to determine the optimum time for the fibers to be aligned in the appropriate direction. Regardless of these variations the extrudate is reproducable on a continuous basis for any length required. This is an important aspect of the invention in that it provides for sheets, rod with any shape desired, such as round or square as may be required, for any length desired.

Therefore the proportion of long fibers which will align themselves perpendicular to the axis of extrusion is predetermined in accordance with the invention by either the length of the slope of the throat and/or by the slope of the throat.

What has been stated above with respect to the long fibers applies also with respect to the medium fiber lengths, that is those above ¼" to about ½" thereto the direction of orientation of the fibers will align themselves depending on the slope of the throat and/or the length of the throat.

However, the difference is that with respect to long fibers about 80 to 100% of the fibers will follow the general rule whereas in the medium size length fiber, about from 50 to 80% of the fibers will follow the general rule.

With respect to the smaller fibers, that is those less than ¼", the general rule will be followed from about 20 to 50% the balance of the fibers being arranged randomly.

It is to be noted that the comparison of percent of fibers aligned on one direction or another is made when the ram stroke has the same speed in each case.

Organization and alignment of the carbon fibers is in accordance with the invention largely governed and predetermined by the slope of the throat and by the length of the slope.

The variations of the throat angles and the ratio of the fill area, tube area, die area can be varied.

FIG. 23 is a graph showing the percent of fiber oriented (at angles shown) vs the fiber length (assuming all fibers in a mix to be of same length).

From the graph of FIG. 23 one skilled in the art is now provided with appropriate formulas for the desired products which products have the desired properties.

As has been noted above the percent of fibers in any particular mix that will be oriented or aligned in the cross-axis (that is about 80 to 90%) direction is controlled by the longer fiber length that is included in any given compound mix. The graph illustrates the distribution curve for fiber length verses the angular alignment of the fibers.

However it is to be noted that when the length of the fibers in any mix are different, that is, the mix contain fibers of different length, for instance, milled (that is less than 1/16) ¼", and ½" long in size the curve for each length fiber is not changed. In fact, only the percent of these fibers either as a percentage of the total amount of fibers in the compound or as a percentage of each length of fibers in a particular mix of fibers will be the main cause of increasing or decreasing the particular physical properties of a compound.

When the strongest composite product is desired, the product has the longest fibers of a given mix aligned parallel to each other and perpendicular to the forces pulling on these fibers.

Illustratively the following examples are to be noted.

1. Where, in a particular composite ram extruded thermoset product all fibers are long and their percentage of the mix of the compound are high, and the forces on them are perpendicular to the alignment of the fibers in that plane, then the tensile strength of the product of the invention in that plane is remarkably high. This applies particularly well to square or round rods. Thus, the invention now calls for a product which is designed to fit the particular purposes or applications for which it is manufactured.

2. Where a proportion of the long fibers in the above mix (of all long fibers) are removed and replaced by shorter ¼" long and milled fibers then the tensile strength of the composite, though not as high in the perpendicular plane, would be remarkably higher in the plane parallel of the pull. The tensile strength of the parallel plane of pull is improved in direct proportion of the amount of long or short fibers in the particular mix.

Therefore, in accordance with the process of the invention custom tailored composite ram extruded thermosets are available which meet the exact design requirements at lowest possible costs.

In accordance with the invention it will also be noted that it is not necessary as it is in accordance with conventional processes and products to include in the composite more of the fiber material than is necessary such as is the practice with conventional products, such as laminates or pulltrusions.

In accordance with the invention as an illustration an air compressor vane prepared with 80% long fibers and 20% resin (a phenolic thermoset) with no other filler gave a very satisfactory performance.

By comparison, the same product with the same excellent performance was obtained in accordance with the teaching of the invention by replacing the 80% long fiber mix by a 30% fiber mix constituted of short, medium and long fibers and 50% of low cost filler.

The resulting product of the invention had all the necessary requirements to meet the performance criteria. It was also considerably less expensive. No other materials tested (over 199 types over 12 years of testing with conventional products) met the price, economy versus performance curve of the extruded fiber reinforced product of the invention.

In FIG. 24 there is shown pie graphs of typical compositions of the composites of the invention.

It will be noted from the graphs that as little as about 20% of fibers to the total composite and as much as about 80% of fiber to the entire composite may be used. Depending on the desired application and physical, mechanical and electrical properties and application of the product of the invention the composite of the invention may be tailored accordingly.

Other than the resin, preferably the thermoset resin used in the invention, and other than the fibers, preferably the carbon fibers, there may be used other conventional materials such as fillers, lubricant, powders which are known in the art. These are illustrated further below. The ram extruded composite products of the invention have improved properties. These properties include the strength properties, particularly tensile strength (k.s.i.), flexural strength (k.s.i.) flexural modulus (m.s.i) compressive strength (k.s.i.) and impact strength (ft. lbs/in). Other improved properties of the products of the invention include heating resistance and properties desired for electrical applications. Specific gravity (g./cc) should also be taken into consideration when comparing the products of the invention with prior art products.

Therefore the products of the invention have an improved combination of selected properties including tension, flexural or cross-breaking strength, impact strength, thermal and electrical properties, water absorption, friction and wear. The tailor-made products of the invention can be so manufactured by the appropriate selection of the mix of carbon fibers and by the arrangement of their orientation within the final composite products so as to have an appropriate combination of valuable properties some of which were illustrated and listed above.

The products of the invention have important applications in electrical, ordnance, aeorospace, industrial, sporting goods and automotive applications. In electrical applications most products require good structural properties as well as electrical insulation properties. Impact strength may be particularly important in high amperage switch and breaker housings.

Other electrical applications include connectors, commutors and insulators.

For military applications products of the invention are particularly useful for military rifle and gun components. Heat resistance is required because of high barrel temperatures.

In the aeorospace industry high strength are necessary heat resistance is also a requirement.

Other industrial applications, pump component parts for chemical and food handling can be manufactured with the composites of the invention.

Other industrial applications include insulators for welding equipment and heat insulating caps for copiers.

In the sporting goods industry high modulus and impact resistance is required in numerous applications, for instance, for golf club heads.

In the automotive field air-pump compressor vanes is a potential for products of the invention. Such products need high strength, low thermal expansion and high temperature resistance (up to 400° F.). A particularly interesting application include the field of air-craft and guided weapon structure which must of course meet most exacting requirements with respect to creep, fatique and thermal cycling. In applications where the manufactured components are subjected to stresses which are largely, if not totally, centrifugal there are important applications for the products of the invention for industrial fans and compressors, in helicopter rotors, in propellers, fans and other turbines.

The products of the invention are also well suited for marine applications where good resistance to water and high specific stiffness is needed.

In the chemical industry, and chemical machinery the products of the invention will find applications.

In accordance with the invention the fiber mix will generally include at least two different size fiber lengths, each one representing average of fiber lengths. Certain products of the invention will include a majority, if not virtually all of the fibers, that is, about 90% or more, being of the long fibers. This is particularly desirable for certain physical and/or other properties to be discussed herein, to be maximized. As a counterpart, there are products of the invention where the fiber length is constituted by virtually only milled or short fibers as defined herein but in accordance with the invention the properties which such composites do have are not the most urgently required properties in industrial applications.

In situations where it is desired to maximize and control the coefficient of expansion so that the product will have the smallest possible coefficient of expansion, it is desirable to use a fiber mixture where the fibers are essentially constituted by whiskers. Typical situations are support members that must match other materials where the coefficient of expansion is to be controlled at the point of contact between the different materials.

An interesting aspect of the invention is where it is desired to use a particular synthetic resin, particularly a thermoset synthetic resin, which is ideal for the application but for its high coefficient of expansion. In that situation in accordance with the invention the synthetic composite will have incorporated therein the necessary proportion of short fibers so as to control and limit the coefficient of expansion.

It will also be seen that in accordance with the invention any synthetic thermoset resin which has lower strength properties can be corrected by incorporating the appropriate longer fibers in accordance with the invention.

In contrast, a synthetic composite which is constituted by virtually only a high proportion of longer fibers does have a combination both of flexural strength dimensional stability and high modulus elasticity in the direction of the fiber orientation. The coefficient of expansion is also limited in the direction of the fibers. The fibers oriented in accordance with the invention will therefore prevent the resin from growing in the direction of the extrusion.

In one illustration of a fiber mix of the invention there will be virtually no fibers which are less than ⅛" and all other fibers will be longer than ⅛" and can be constituted in a ratio from about 5 to 90% of the middle size fibers or conversely 5 to 80% of the longer size fibres.

In another embodiment of the fiber mix of the invention, there is present ⅓ of each one of the different type fibers that is a small, medium and long size fibers. In that situation the result is a tangled mass of fibers were the longer fibers tend to align themselves about 90° or cross-axis with respect to the axis of the extrusion, the middle length fibers will arrange themselves somewhere between the 90° alignment to the axis and the 0° degree with respect to the axis and they are, when examined under the micron microscope, found tunneled between the twisted in between the larger fibers. The milled or the smallest size fibers which are randomly arranged are found organized in all different directions (three dimensional) forming a tangled mass with the medium and long size fibers. An aspect of the product and operation of the invention is illustrated in a situation where the mix is constituted by approximately ⅓ each of the small, medium and large size fibers. That situation has been described above.

In another illustration of the invention where about 60% of the fibers are the long size fibers, approximately 90 to 100% of the longer fibers will be aligned in the cross-axis direction and the balance, that is the other 40% of the smaller fibers, will again be arranged randomly. Therefore the general rule holds regardless of the mixture whether it is made of three or less components of the mixture of fibers.

In the case where the fibers are oriented in a random pattern, the distribution approaches the curve of a standard bell curve. The slope of the curve being related to the length of the fibers and the percentage of these fibers as a percent of all the fibers.

The more homogeneous the intermediate size mixture of fiber the sharper the slope of a bell curve. In contrast if distribution is less homogeneous, the curve is flatter. In the situation where ⅓ of the fibers are of each size the curve is bell shaped.

With respect to the situation where all the fibers are of very short length i.e. under about ⅛" long and in low percentage in the mix i.e. below 15% of the mix the pattern of the fibers are as pre-selected aligned as shown in FIG. 15. In order to obtain ideal alignment of the fibers computerized scanning measurements are made of the fiber alignment of several runs (from two to about 5 times) and the ideal fiber alignment is selected. Computerized operations which of course are suitable for the operation of the apparatus preferably using this invention including the feeding of the composite and the operation of the ram is contemplated by the invention.

With respect to the industrial applications discussed above, tensile strength and flexural strength are very important physical properties of the composite products of the invention. Important applications are in the air compressor industry, in the sliding vane air compressor where strength in the cross-axis is essential. The tensile strength in the direction of the extrusion coefficient of expansion ideally should be the smallest in the direction of extrusion in order to obtain very high flexural strength in the vane so that the member will slide in and out of the slot under pressure but will not break, not flex and its modulus in the flexing direction is also very high. High tensile strength is not essential in this application.

It is an advantageous aspect of the invention that where loss of physical strength in the direction of the extrusion and loss of coefficient of expansion is to be minimized, the proportion of resin can be lowered and the ratio of filler and resin be increased. Therefore, for instance, the ratio of filler can be up to 90% of fibers or powders combined and the amount of resin being about 25 to 30% or even less.

As explained above, therefore, by increasing the slope of the throat, the product which results has a greater proportion of longer fibers aligned along the axis of extrusion.

Another application important for the products of the invention are bearing materials which must be both rigid to resist the press fit of a bearing into a bore and also have excellent coefficient of expansion, namely, no coefficient of expansion in the hoop strength direction, which in this case is circular. Hoop strength is defined as a strength to resist bursting of the tube; it is the resistance to diameter expansion or to diameter closing down or shrinkage under press fit. This type of application has considerable merit in the sleeve bearing area. The product of the invention can be made to have its fibers oriented in the direction of the circumference of the bearing. This imparts to the product resistance to close down when the bearing is pressed fit into a bore, it also prevents the coefficient of expansions of the bearing under heat.

Another industrial application is in tubes or rods when a tensile strength is more important than the circumferential strength where the rod is to be machined. In those situations the product has a higher percentage of fibers arranged in the direction of extrusion as opposed to being organized in the cross-axis of the axis of extrusion.

Another industrial application where in the products of the invention, the fibers, particularly the smallest fibers, are in random or haphazard arrangements has (i.e. with the least proportion in alignment either perpendicular to the axis of extrusion or parallel to the axis of extrusion) important applications may be found for instance in the ball-bearing field where ball-bearings are ground from rod stock and the fibers are, in accordance with the invention in a homogeneous mix. Substantial grinding geometry will be imparted through the ball-bearing and subsequently to the strength of the ball because no direction of the fiber has been favored and therefore the ball will have strength in all directions.

An advantage of a flat product of the invention like plates is that the fibers are positioned in different planes and angles so that they add considerable greater strength to the plate. In contrast, laminates have a tendency to delaminate between layers themselves and do not have the strength of the products of the invention.

With respect to the percentage of fibers relative to the total mix, such has not been illustrated in the drawings. In accordance with the invention the percentage can vary from 5% by weight to about 80% by weight of fibers to the resin and filler (when such is provided).

However, it is noteworthy is that in accordance with the invention the percentage loading of fibers with respect to the total bulk of the resinous (and optional filler) of the composition has virtually no effect on the pre-selected alignment of the fibers in the composite.

The proportion of fibers, particularly carbon fibers, in the mix can greatly vary in accordance with the invention depending on the length of fibers and application for which the composite is to be used. For practical applications it can vary from about 5 to over 90% generally from 10 to 80% for most applications. In some applications the fibers are about 50% and the resin is the balance. In some applications the fibers are 50% and the balance being constituted of resin and filler is another 50%.

The composite product is produced in the preferred in accordance by the apparatus shown in U.S. Pat. Nos. 4,240,997 or 4,141,678.

In accordance with the invention the plastic/fiber compound is made to move down the fill tube and into the filler section. The mix can also be pushed down with a plunger if desired. The fibers at this point, regardless of length, are not aligned in any prescribed direction, unless somewhat oriented by a stuffer. The extrusion ram is in a backward most position of its normal reciprocating cycle.

In a second stage the extrusion ram starts to move forward and in so doing moves past the fill tube opening and shuts off any further flow of the compound resin/fiber into or out of that opening. The ram continues to move forward with the compound until it reaches the end of its stroke length. In so doing, it starts to compress the loose compound into a tightly packed mass.

The force applied to the ram to move the material over the end portion of the first path is controlled so as to move the ram at a substantially constant speed with compensation for variations in the back pressure from the material to maintain the ram speed substantially constant. The speed of the ram is so controlled as not to be in excess of that at which the material melt softens substantially uniformly throughout the cross-section in response to external heat and the ram pressure heat. Unlike the injection molding operation where the melt blows down the middle of the runner and leaves a boundary layer of resin-fibers along the side of the runner and the center part continues into the mold cavity by a gate, in the ram extrusion operation there is no blowing down the middle. The resin-fibers move through the profile as one non-flowing mass which finally hardens. Compression of the material during travel through the first path is a major factor in producing alignment of the fibers in the flow direction.

As the composite is jammed into the throat section of the tool, the following occurs. Fibers which are long are aligned in the plane perpendicular to the motion or axis of the ram. Fibers that are shortest are randomly arranged and do not take any prescribed alignment position. Fibers that are intermediate or medium in length are distributed in a random pattern with a distribution that approaches the curve of a standard bell curve shape.

The present of the alignment is also affected by the amount of fibers with respect to the amount of resin content in the compound.

Where the throat of the apparatus changes in cross-section with respect to that of the fill tube this change causes the fibers to reorient themselves as follows. Where the cross-section does not change from that of the fill tube the fibers will not be essentially altered from the planar direction. Where the cross-section does change, as explained above, the fibers are then oriented in a direct percentage of that tooling change. As discussed above, the higher the degree of the angle, the higher the number of fibers oriented in the direction of the extrusion. Once the mass goes through the throat, the alignment is essentially fixed except to compress it tighter as the hole die is filled up.

In the third stage, the final alignment of the fibers is shown for this particular tooling designed as is asserted above. It will be noted that the long fibers in the top views of the Figures are about 90% aligned in the cross-axis plane which is essentially perpendicular to the ram axis (or 90° to the direction of the extrusion).

Note also that on the side views of the Figures the fibers that are near the surface of the throat have been turned almost back to the direction of extrusion (or parallel to the axis of extrusion). Note also that in the side aligned fibers, as mentioned above, are not altered in the direction as they pass down the die section. It is noteworthy further, in the top views of the Figures that the fibers that go past a straight, unaltered throat angle are not altered in their cross-axis direction.

As the charge is pushed further down the fill tube, the fibers do not change their alignment unless further re-aligned by other portions of the tooling. If the ratio of the fill tube cross-section is the same as the die cross-section, the fibers will not be essentially disturbed except for the melting of the plastic which will allow the entrapped air to escape and the charge will therefore become denser. As the charge becomes hotter and hotter, the end of the shot-to-shop charges will melt together and the fibers will intermingle and form a homogenous continuous mass. The short and medium fibers at this time will intermingle better than the longer fibers. If there is no mix of short, medium, or long fibers, but only all of one length short or medium fibers, the resultant charge would have a standard bell curve distribution of the angles of alignment compared to the axis (0°) of the extrusion. However, if the cross-section of the extrusion die is different in square inches from the fill tube, for example elliptical in shape, then the fibers will further align as they progress through the throat and into the die section. Various ratios of the area of the fill tube to the area of the die will give resultant effects on the degree planes of the fibers as follows:

a) If the height of the fill tube and the height of the die are the exact same dimension (1:1), the fibers in the direction of bottom to top (vertical) will not be essentially disturbed as they progress down the die.

b) If the ratio of the height of the fill tube to the height of the die is other than 1:1, the result on the fiber direction (vs 0°) will be altered in direct proportion to the change in ratios. That means that if the height of the die is ½, ¼, 1/5 etc., of the fill tube height, the angles of the long fibers will be proportionately altered by this change in die height.

c) Similar changes in the width ratios would have the same results to the fibers that were originally positioned in the horizontal plane in the fill tube.

d) Combinations of changes in both height and width of the die versus the fill tube will produce combined changes in the alignment of any fiber in the die versus its original position in the fill tube.

e) By controlling these variables, the process can provide controlled alignment directions of the fibers that are very predictable and consistently the same on a continuous inch per inch or foot per foot basis in a long continuous extrudate of unlimited length.

f) Changing the percentage of various fiber lengths on a given die set can alter the percent of fiber alignment.

g) Changing the percent of fiber content of the resin/-fiber mix or ratio will alter the alignment of fibers.

h) The direction of the fibers can be changed more than once as long as the resin continues to stay in a soft melt condition. Once the resin has hardened, any further attempts to align the fibers is not readily possible.

i) Various melt viscosities of the resin can affect the fiber alignment. The proper viscosities of the whole plastic compound may be adjusted to suit the various complex cross-sectional areas and ratios of fill tube to die. Also, the required throat angles to achieve this may be reconsidered when the viscosity changes. Steep versus shallow throat angles can affect the rate of ratio change and should be considered for each different shape or profile desired.

Additionally, varying the height of the die cross-section while holding the width constant to the fill tube is a typical situation. This will allow the long fibers to be unaltered in their alignment in the width dimension while the short and medium fibers will be be changed as the charge moves from the fill tube to the die cross-section dimension where the height is smaller but the width is the same. Fibers running common to the width generally are not altered. Fibers running common to the height generally go through a change in direction as they proceed through the reduced height of the throat to reach their final orientation in the die section. These changes are predictable according to the invention and are in direct proportion to the ratio change in the height of the cross-section. It has been found that 90% of the long fibers are aligned in the width dimension, at approximately 80 to 90 degrees to the axis of extrusion in a rectangular strip that has a die designed to hold the width of the die constant to the fill tube and wherein only the height is varied. All fibers in the height plane had angle changes proportional to the reduction change in die height as compared to the fill tube height. That is, long fiber angle changes are proportional to the changes of the direction or plane in which they lie as compared to the original alignment they originally had in the fill tube. The resultant "working" or continuous intermingling of the fibers as they are moving down the extrusion throat produces a product that is predictably homogeneous with purposefully aligned fibers that are intermingles better than any molding could ever perform, with no resin-rich pockets that occur in molding. The "working" of the compound through the changes in throat dimensions produces no resin-rich areas other than the thin "skin" on all extruded and molded products.

The predictable alignment of 90% of the long fibers at 80-90 degrees to the axis of extrusion (or long axis of the part) has been found not capable of being produced by any other molding process on a continuous basis. Pultrusions cannot align the majority of the filler in the 90 degree to axis direction. Nor can they run a discontinuous fiber product through their pull dies. They must have a very high percentage of zero degree continuous fibers going through the die in order to operate. Surface viels used in pultrusion are not as strong as 90% aligned fibers.

During a portion of the path followed by the ram toward the die, the force exerted on the ram will be opposed by the pressure developed by the material filling the filler section of the mold as that material starts to become compressed. The pressure will be light, at first, allowing the ram to move essentially unimpeded. It will then increase gradually as the material becomes progressively compacted and begins to be forced into the constricting throat of the die. Control of the ram speed, heating of the material and the degree of constriction, as is possible with the apparatuses disclosed in the aforementioned U.S. Pat. Nos. 4,141,678 and 4,240,997, permits control over the pressure which has been found to affect the properties of the product. A higher pressure has been found to favorably affect the flexural strength.

A determination of the orientation of fiber distribution is obtainable in accordance with known methods and ascertainable by micrographs. An instrument which is useful in that connection is the Fraunhofer diffractometer. This is an optical device commonly used for generating optical diffraction patterns. Such a device is available at the Center for Composite Materials, Department of Chemical Engineering, University of Delaware, Newark, Del.

The resins which may be utilized in the invention are thermoplastics or thermosetting resins which can be extruded. Preferably, the resins are thermosetting. Among the thermosetting resins which may be utilized are the phenolic resins, such as phenol-formaldehyde, phenol-furfural, resol and Novolak resins, and mixtures thereof. Also included are the melamine-phenolic resins and the epoxy resins which are capable of extrusion. Other of such resins are disclosed in *Modern Plastics Encyclopedia*, 1984-85, McGraw-Hill, Vol. 61, No. 10A, which is incorporated herein by reference.

The reinforcing fibers which may be utilized in the invention are those which are known to be useful as reinforcing fibers such as carbon, glass, synthetic resin and asbestos fibers as well as those mentioned in *Modern Plastics Encyclopedia*, supra. Preferably, carbon and/or glass fibers are used. Chopped fibers are commercially available, for example, from Hercules Corp. in various lengths from about 1/16 to 2 inches. Milled fibers are usually produced in about 1/32 to 1/16 inch lengths. Fiber length of more than 2 inches in average length make the molding more difficult and fibers of less than 1/32 inch are generally insufficient for providing reinforcing strength.

The percentage of fibers in the resin depends upon the particular properties desired. Generally, fibers in an amount of 20 to 60% by volume of the composite material has been found suitable for most needs.

The resin may include one or more fillers in addition to the fibers, preferably in an amount of 0 to about 30% by volume of the composition depending on the properties and performance of the product desired. Among the fillers which may be utilized are clay, chalk, mica, lamellar glass, cellular material such as vermiculite, glass, graphite, cellulose, nylon, rayon, alumina, aluminum powder and the like. The fillers add bulk and improve some properties such as the compressive strength and modulus, and they generally improve the heat resistance and reduce the coefficient of thermal expansion.

The filler may be an adhering filler or a non-adhering filler and comprise together with the fiber up to 80% by volume of the composition. Other types of fillers which may be utilized are mentioned in the afore-mentioned U.S. Pat. No. 4,175,070, which is herein incorporated by reference.

It has been found to be advantageous to post heat cure the extruded resin in order to obtain the fullest cure and to control shrinkage. The curing can be accomplished by heating from 2-8 hours at a temperature between 225 and 425 degrees F., preferably 320-370 degrees F. A curing temperature equal to the highest anticipated operating temperature of the part provides one means of controlling shrinkage.

The following examples are illustrative of the invention and are not intended to be limiting. It is evident to one skilled in the art that the ingredients of the various compositions illustrated, their relative proportions and amounts, as well as other variables and parameters may be modified while being within the scope and the contemplation invention.

EXAMPLE 1

The following static tests reported in Table I were conducted on specimens which were cut from turbine blades produced according to the invention utilizing a ram extrusion apparatus according to U.S. Pat. No. 4,240,997 wherein:

Specimen 1 is a cut from a turbine blade formed of 30% phenolic-formaldehyde resin, 30% of carbon fibers having an average length of ¼ inch, and 40% mineral filler, which was produced under medium pressure.

Specimen 2 is similar to Specimen 1 except that the blade was produced under a higher pressure.

Specimen 3 is a cut from a turbine blade formed of 70% phenolic-formaldehyde resin and 30% carbon fibers of an average length of ¼ inch.

Specimen 4 is similar to Specimen 3 except that the blade was produced under a higher pressure.

TABLE I

| | Cut | Specimen 1 | Specimen 2 | Specimen 3 | Specimen 4 |
|---|---|---|---|---|---|
| Room Temp. | 1 | 14,300 PSI | 16,600 PSI | 15,600 PSI | 15,100 PSI |
| Flex | 2 | 9,200 PSI | 12,000 PSI | 10,500 PSI | 9,100 PSI |
| Room Temp. | 1 | $2.0 \times 10^6$ PSI | $1.99 \times 10^6$ | 1.83 PSI | 1.90 PSI |
| Modulus | 2 | $1.39 \times 10^6$ PSI | $1.88 \times 10^6$ | 1.62 PSI | 1.68 PSI |
| 4 Days | 1 | 12,000 PSI | 12,500 PSI | 13,200 PSI | |
| 200° C. Flex | 2 | 7,800 PSI | 10,200 PSI | 9,400 PSI | |
| 4 Days | 1 | $1.53 \times 10^6$ PSI | $1.39 \times 10^6$ PSI | 1.52 PSI | |
| 200° C. Mod. | 2 | $1.26 \times 10^6$ PSI | $1.38 \times 10^6$ PSI | 1.31 PSI | |
| 10 Days | 1 | 13,300 PSI | 16,500 PSI | 12,900 PSI | |
| 200° C. Flex | 2 | 7,500 PSI | 10,400 PSI | 7,700 PSI | |
| 10 Days | 1 | $1.62 \times 10^6$ PSI | $1.75 \times 10^6$ PSI | 1.54 PSI | |
| 200° C. Mod. | 2 | $1.26 \times 10^6$ PSI | $1.38 \times 10^6$ PSI | 1.31 PSI | |
| Thermal | 1 | $6.0 \times 10^{-6}$/°F. | $6.9 \times 10^{-6}$/°F. | $5.6 \times 10^{-6}$/°F. | |
| Expansion | 2, 3 | $9.8 \times 10^{-6}$/°F. | $9.8 \times 10^{-6}$/°F. | $8.0 \times 10^{-6}$/°F. | |
| $9.2 \times 10^{-6}$/°F. | 2, 4 | $11.6 \times 10^{-6}$/°F. | $10.3 \times 10^{-6}$/°F. | $9.5 \times 10^{-6}$/°F. | |
| Shrinkage | 2 | $3.47 \times 10^{-3}$ in/in | $2.46 \times 10^{-6}$ in/in | $2.25 \times 10^{-3}$ in/in | |

1 — Transverse Specimen
2 — Longitudinal Specimen
3 — Edge
4 — Middle

EXAMPLE 2

Test samples cut from a turbine blade which was prepared similarly to Specimen 2 of Example 1 had the following properties.

TABLE II

| Test Parameter | Specimen Orientation | |
|---|---|---|
| Room Temp. Flex Strength | Transverse | 15,700 PSI |
| | Longitudinal | 9,500 PSI |
| 4 Days @ 200° C. Flex Strength | Transverse | 14,000 PSI |
| | Longitudinal | 7,000 PSI |
| 10 Days @ 200° C. Flex Strength | Transverse | 11,200 PSI |
| | Longitudinal | 7,200 PSI |
| Coefficient of Expansion | Transverse | $2.7 \times 10^{-6}$/°F. |
| | Longitudinal | $5.5 \times 10^{-6}$/°F. |
| Shrinkage | Longitudinal | $1.5 \times 10^{-3}$ in/in |

In the above table the coefficient of expansion is found to be excellent. However, the tests, indicate that greater post-curing is desirable in order to improve shrinkage.

EXAMPLE 3

A compressor blade was extruded, according to the present invention and as described in Example 1, containing 30% phenolic-formaldehyde resin, 30% carbon fibers having an average length of ¼ inch and 40% of a mineral filler. The extrudate was post cured 12 hours at a maximum temperature of 350 degrees F. The blade was placed in a laboratory C50H compressor. The output air temperature during the test was dept within the range ob 320-325 degrees F. The blade performed as follows:

| Operating Time: hours at 1200RPM | 2057 | 3800 |
|---|---|---|
| Blade Size: | 6.135" × 308" × .2.047" | 6.135" × .308" × 2.047" |
| Average Wear Rate (Blade Width): | $1.12 \times 10^{-5}$ in/hr | $.98 \times 10^{-5}$ in/hr |
| Average Concave Wear: | .005" | 0.10" |

EXAMPLE 4

Tubing was extruded following the procedure of Example 3 except that 50 percent of the fibers utilized were milled fibers having a length of 1/16 inch or less. After post curing the tubing was suitable for use as plumbing pipes.

I claim:

1. A fiber-reinforced rigid and solid phenolic thermoset resin composite having a longitudinal axis and having improved physical properties, including improved compressive strength, impact strength, and electrical properties which comprises a thermoset phenolic resin containing carbon fibers, said carbon fibers being a mixture of long fibers having a length of from about ½" to about 2", medium fibers having a length of from about ⅛" to about ¼" and short fibers having a length less than ⅛", embeded, oriented and organized in the phenolic resin so that from about 75 to about at least 90% of the long fibers and from about 75° to about at least 90° of the medium fibers are oriented about 80 to 90% perpendicular to the longitudinal axis of the composite and the short fibers are randomly oriented.

2. The composite of claim 1 wherein the fibers are constituted by about one-third each of long, medium and short fibers.

3. A fiber-reinforced rigid carbon phenolic thermoset resin composite having a longitudinal axis and having improved physical properties, including improved compressive strength, impact strength, and electrical properties which comprises a thermoset phenolic resin containing carbon fibers, said carbon fibers being a mixture of long fibers having a length of from about ½" to about 1", medium fibers having a length of from about ⅛" to about ¼" and short fibers having a length less than ⅛", embeded, oriented and organized in the phenolic resin so that from about 75 to about at least 90% of the long fibers and from about 75° to about at least 90° of the medium fibers are oriented about 80 to 90% perpendicular to the longitudinal axis of the composite and the short fibers are randomly oriented 4. The composite of claim 3 wherein at least about 90% of the medium fibers are oriented about 80° to 90° perpendicular to the longitudinal axis of the composite.

5. The composite of claim 1 wherein at least 90% of the long fibers are oriented about 80° to 90° perpendicular to the longitudinal axis of the composite.

6. The composite of claim 5 wherein at least 50% of the fibers present are long fibers.

7. The composite of claim 1 wherein at least 90% of the medium fibers are oriented about 80° to 90° perpendicular to the longitudinal axis of the composite.

8. The composite of claim 1 wherein at least 90% of the long fibers and at least 90° of the medium fibers are oriented about 80° to 90° perpendicular to the longitudinal axis of the composite.

9. The composite of claim 7 wherein 0 to 60% of the fibers are short and medium fibers and from about 40 to 100% of the fibers are long fibers.

10. The composite of claim 9 wherein at least 50% of the long fibers are oriented about 80° to 90° perpendicular to the longitudinal axis of the composite.

11. The composite of claim 10 wherein at least 90% of the long fibers are oriented about 80° and 90° perpendicular to the longitudinal axis of the composite.

12. The composite of claim 1 wherein about 50% of the fibers are of substantially equal length.

13. The composite of claim 1 further comprising about 0 to about 30% by volume of filler material, the filler material and the carbon fibers comprising together up to about 80% by volume of the composite.

14. The composite of claim 1 wherein the proportion of the fibers in the composite is about 5 to about 90%.

15. The composite of claim 1 wherein the proportion of the fibers in the composite is about 10 to about 80%.

16. The composite of claim 3 wherein at least 90% of the long fibers are oriented about 80° to 90° perpendicular to the longitudinal axis of the composite.

17. The composite of claim 3 wherein at least 90% of the medium fibers are oriented about 80° to 90° perpendicular to the longitudinal axis of the composite.

18. The composite of claim 3 wherein at least 90% of the long fibers and at least 90° of the medium fibers are oriented about 80 to 90% perpendicular to the longitudinal axis of the composite.

19. The composite of claim 3 wherein about 50% of the fibers are of substantially equal length.

20. The composite of claim 3 wherein the proportion of the fibers is about 5 to about 90%.

21. The composite of claim 3 wherein the proportion of the fibers is about 10 to about 80%.

22. The composite of claim 5 which is a device selected from the group consisting of a turbine and compressor blades.

23. The composite of claim 5 which is a compressor housing.

24. The composite of claim 5 which is a compressor rotor.

25. The composite of claim 5 which is a bearing.

26. The composite device of claim 22 which has a flexural strength at room temperature of about 14,300 PSI to about 16,600 PSI.

27. The thermoset composite device of claim 22, the modulus of which is about $1.36 \times 10^6$ PSI to about $1.88 \times 10^6$ PSI.

28. The thermoset composite device of claim 22, the thermal expansion of which is about $5.6 \times 10^{-6}/°$ F. to about $9.8 \times 10^{-6}/°$ F.

29. The composite of claim 3, which is a rigid, rectangular sheet.

* * * * *